Dec. 12, 1950     R. C. LEWIS     2,534,137
VIBRATION ISOLATOR PAD
Filed March 25, 1946     2 Sheets-Sheet 1
FIG. I
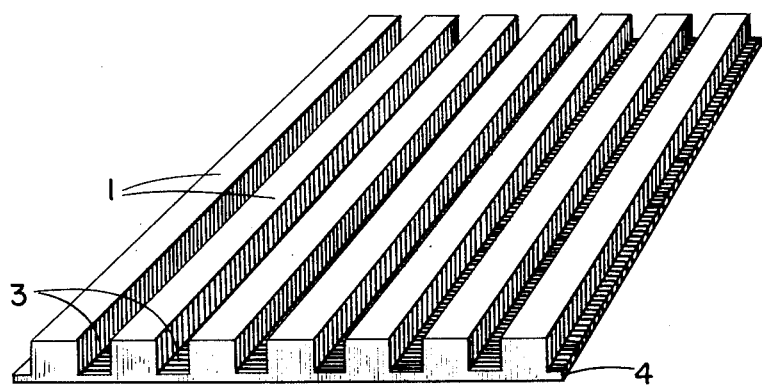
FIG. II
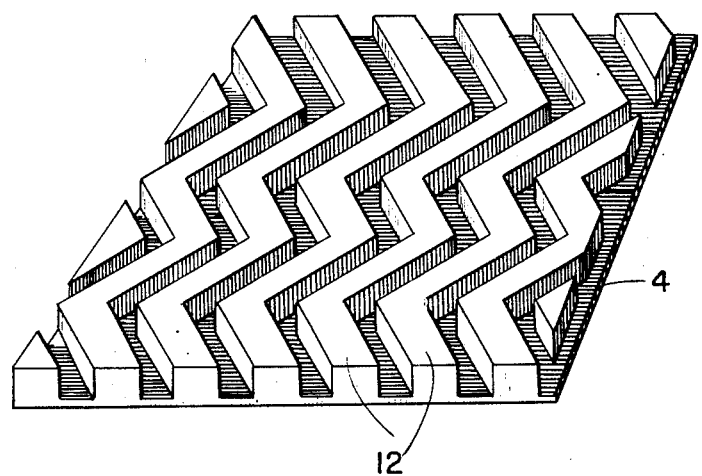
Inventor
Robert C. Lewis
By his attorneys
Howson and Howson Dec. 12, 1950 R. C. LEWIS 2,534,137
VIBRATION ISOLATOR PAD
Filed March 25, 1946 2 Sheets-Sheet 2
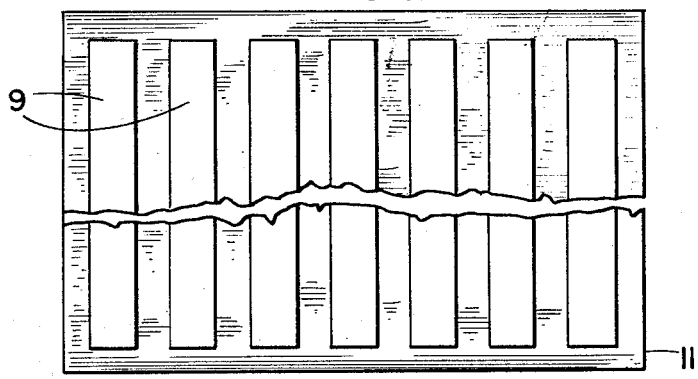
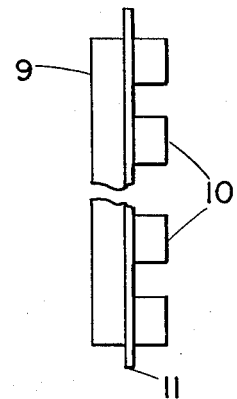
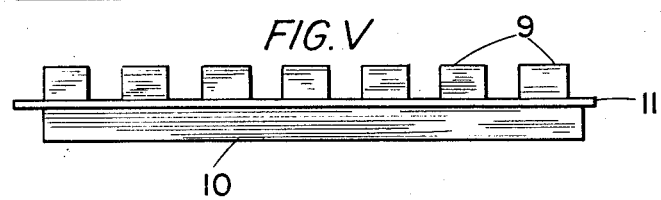
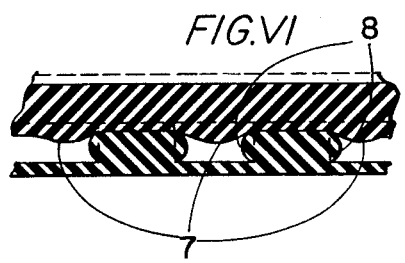
Inventor
Robert C. Lewis
By his attorneys
Howson and Howson Patented Dec. 12, 1950

2,534,137

UNITED STATES PATENT OFFICE 2,534,137

VIBRATION ISOLATOR PAD

Robert C. Lewis, New Haven, Conn., assignor to The M B Manufacturing Company, Inc., New Haven, Conn., a corporation of Connecticut Application March 25, 1946, Serial No. 657,035

3 Claims. (Cl. 154—44)

This invention relates to a pad of resilient, natural or synthetic rubber for use in isolating vibration. It has been known heretofore to use materials such as cork and felt in the form of thin sheets for the isolation of vibrations. Rubber has not proved satisfactory, although inherently it is a much more desirable material. The use of plain rubber sheeting has not proved satisfactory for this purpose because it is practically non-compressible, and in sheet form, where the area of the face is many times the area of the thickness of the pad, the pad has very little flexibility. The object of the present invention is to produce a pad made of resilient, natural or synthetic rubber which is compressible and has other advantages not found in cork or felt, as described below.

Heretofore it has been known, when using felt or cork, that the proper degree of deflection of a pad for a given increase in load per square inch will be constant whether the pad is 10 square inches in extent, 100 square inches, or 1 square inch. In the case of rubber sheeting the deflection figure is not constant for different sizes of pads. Thus, 1 square inch of a rubber pad ¼" thick might have such properties as to be deflected 20% in thickness under a load of 120 pounds. The same rubber, however, if the pad were 10 square inches in extent, would deflect approximately 5½% under the same load of 120 pounds per square inch (i. e., a total load of 1200 pounds). Again, a pad of 100 square inches made of the same material and having the same initial thickness, would undergo practically zero deflection for the same load of 120 pounds per square inch (i. e., a total load of 12,000 pounds). It might also be noted that in the case of the 10 square inch and the 100 square inch pads, if it were desired to increase the load until this same deflection of 20% was obtained, the increase in load required would give the rubber very high local stresses which certainly would contribute to the deterioration of the performance of the rubber as it aged. These facts indicate why rubber in pad form, in spite of the fact that it has continued resilience and freedom from packing or settling which make it superior to materials of other sorts, has not been availed of heretofore.

According to the present invention, my pad is made of resilient, natural or synthetic rubber and has an essentially constant deflection for the same loading, regardless of pad size. If desired, of course, the deflection can vary slightly for the same loading, as it is of the essence of my novel form of construction that the degree of deflection for the same loading, regardless of pad size, can be controlled. In other words, with my construction the relatively constant percentage of load-supporting area to a total area can be obtained regardless of whether the object is a small one or a large one.

In the drawings:

Figure I is a perspective view of one row or element having spaced, straight parallel ribs such as used in making the structure of my pad;

Figure II is a similar view of a similar element having spaced, zig-zag parallel ribs;

Figure III is a plan view of an embodiment of my pad such as could be molded complete in a single operation;

Figure IV is a view of the right end or edge of the pad of Fig. III;

Figure V is a view of the lower edge of the pad of Fig. III; while

Figure VI is a diagram showing how my pad obtains lateral stability under compression.

The essential feature of my pad consists in one row of spaced, parallel ribs 1 laid over a second row of similar spaced, parallel ribs 2 of similar composition, the two rows or layers being at right angles to each other. The ribs preferably are substantially rectangular in cross-section and are at least as wide as they are high, it being noted that the side walls of said ribs lie in planes normal to the plane of juncture of the two rows of ribs. The amount of space 3 between adjacent ribs will be discussed a little later in this description. It is convenient to mold the rubber ribs with a membrane 4 connecting the ribs to maintain the spacing while permitting resilient movement.

In order that the advantages of this simple construction of pad may be obvious, the action of the pad under load between two flat surfaces will now be discussed. As shown, for example, in Fig. I of the drawings, the strips or ribs are approximately the same width as the space between them and each rib is approximately rectangular in cross-section. Since the load-supporting area of the pad consists only of those areas 5, 6 of the ribs which are in contact with the ribs of the other element, i. e., where the ribs cross (see Fig. VI), it will be seen that only about 35% of the total area of the pad is included in the load-supporting area of the pad. With this construction, there is adequate free space to accommodate the bulge of the load-supporting areas, i. e., the loaded rubber sections. By having a relatively large number of ribs per unit in pad width, it is possible to preserve a relatively constant percentage of load-supporting area to total area in a small pad or in a large pad. In other words, a commercial size of pad has a desirable percentage of load-supporting area to total area and yet provides spacing for bulging in all desired directions at such intervals and locations as to avoid high local stresses and yet to permit the necessary deflection.

While this high degree of uniform resilience in a pad which is large in area relatively to its thickness is very important, my invention has a second advantage. It is well known in the art of vibration isolation that the stiffness of a given rubber is at least four times as great in compression as it is in shear. In the case of a rubber pad, movement in shear would mean that one of the external faces is attempting to move laterally with relation to the opposite face. I have found that under such conditions my novel pad has an increased lateral stability. Apparently this lateral stability is due to a combination of two effects. The first effect is the increase of flexibility of the pad in a direction normal to its surface because of the provision of adequate free areas into which the rubber can bulge. It will be observed that the spaced cross-rib feature breaks up the continuity of the rubber in two directions at such frequent intervals that bulges due to compression find relief, and without undue local strain. The second effect is the interlocking effect of the loaded ribs where they cross each other. This bulging downwardly and laterally to provide the interlocking gives a lateral bracing or stiffening effect. This can be seen in Fig. VI of the drawings. Looking at Fig. VI, it should be noted that the dotted lines indicate the positions and shapes of the parts before the load is imposed, and the solid, shaded parts indicate the relations of the parts after loading. It will be observed that the upper rib lying crosswise of the figure has not only been pushed down as an entirety, but the load-supporting areas 5 of that rib have aided in forcing rubber laterally down in between the ribs 2 of the lower layer. These bulges downwardly from the upper rib are indicated by the reference character 7. Cooperating to produce the interlock of the upper and lower ribs are the lateral bulges 8 of the lower ribs 2. These lateral bulges 8 narrow the space 3 between the ribs 2 and by thus concentrating the bulges 7 in a narrow space, make them deeper and effective for lighter loads than otherwise. It will be observed that this interaction occurs in both major axes in the horizontal plane.

The combination of these two effects is to provide a pad in which the ratio of normal stiffness or stiffness in compression to lateral stiffness or stiffness in shear is reduced to the minimum. It has been found that this ratio of stiffness does not vary appreciably over wide limits of variation in the size or shape of the pad, provided a relatively large number of ribs are furnished per unit area of the pad.

As indicated in Fig. II of the drawings, it is possible to obtain some of the advantages of my invention by having the ribs or strips in wavy or angular form. In any case, they should be parallel to each other, i. e., maintain their spacing from each other, at all points, and the side walls of the ribs should lie in planes normal to the plane of the bases of said ribs. The single layer or row of ribs 12 shown in Fig. II should be so combined with the other row that the ribs cross at right angles.

My entire pad can be molded in a single operation. This is done by molding the bars at right angles to each other with a single membrane between them. Thus the two rows of ribs are laid at right angles to and permanently joined to each other in fixed position, the resilient material in one row of ribs being integrally molded with the resilient material in the other row where the ribs cross each other. In this way slippage of the ribs on each other is avoided and the minimum ratio of normal-to-lateral stiffness is attained. If desired, the membrane between the two sets of bars can be omitted, though we find it preferable from a manufacturing point of view to have such membrane between the two sets of bars. In Figs. III, IV and V I have shown such an embodiment. Here the ribs 9 of the top row or layer and the ribs 10 of the lower row are held together by a single rubber membrane 11. While the membrane is located at the point of juncture of the ribs, it is proper to say that the two rows of ribs are functionally and actually in contact, it being noted that the side walls of the ribs lie in planes which are normal to the plane of the membrane. The presence of the membrane 11 where the ribs 9 and 10 cross does not prevent the type of interlocking bulges shown in Fig. VI.

It will be seen that my novel pad makes it possible to have a relatively thin pad of large enough area to be of value commercially, in which the rubber provides a support at closely spaced points and at the same time provides space into which the rubber can bulge so as to maintain the proper resilience at different degrees of compression. It will also be seen that owing to the particular structure which I have invented, a surprising and useful evening of the ratio between normal and lateral stiffness in the pad has been produced, and all this is obtained without abnormal stresses in the rubber. Essentially my construction comprises two sets of spaced bars which at any given point are substantially at right angles to each other, the spacing and cross-sectional shapes of the bars being arranged according to the load requirements of the pad. Thus, for example, it might be pointed out that preferably the bars are at least as wide as they are high in order to avoid the possibility of a bar "rolling over" under excessive load. Again, the amount of space between the bars can be varied according to the load requirements. Generally speaking, where a cushion of the type here involved is used, the ideal load deflection from the point of view of efficiency in isolating the vibration, is somewhere in the neighborhood of 20% and if occasional heavy loads are anticipated it may be desirable to have the space between the bars such that the bulging rubber of two adjacent bars will contact shortly after the 20% deflection point is reached. In this way a snubbing action is obtained and substantially greater deflection is avoided. In any case it will be seen that by means of having these spaced bars at right angles to each other, it is not only possible to cut down the proportion of load-bearing surface to total area, so as to give the desired load deflection characteristics and to obtain the same deflection for the same load per square inch regardless of the area of the pad without appreciable change in the percentage of load-supporting area to total area; but it is also possible to obtain a ratio of normal stiffness to lateral stiffness far better than is found in pads heretofore known and to maintain that stiffness substantially uniform over a wide variety of areas and shapes of pads.

I claim:
1. A vibration isolator pad of resilient, natural or synthetic rubber and comprising a row of spaced parallel ribs each rectangular in cross-section, in combination with a second row of similar ribs of similar composition running at right angles to the ribs in the first row, the side walls of said ribs lying in planes normal to the plane of juncture of the two rows of ribs, there being a multiplicity of ribs per inch, and the resilient material in each row of ribs being integrally molded with the resilient material in the other row where the ribs cross, whereby slippage of the ribs on each other is avoided, the maximum lateral stiffnesses are obtained, and the lateral stiffnesses under load are equal.

2. A vibration isolator pad of resilient, natural or synthetic rubber and comprising two open rows of spaced, parallel ribs each rectangular in cross-section and of similar composition, there being a multiplicity of ribs per inch, said ribs being laid across each other at right angles, the resilient material in one row of ribs being integrally molded with the resilient material in the other row where the ribs cross each other, in combination with a thin membrane located between the two rows holding the ribs in their arrangement, said membrane being not more than approximately half the height of a single rib, whereby slippage of the ribs on each other is avoided and the minimum ratio of normal-to-lateral stiffness is attained.

3. In a vibration isolator pad according to claim 2, the presence of a form factor in said individual ribs such that the height of the rib plus the membrane is approximately equal to the width of the rib.

ROBERT C. LEWIS.

REFERENCES CITED

The following references are of record in the file of this patent:

UNITED STATES PATENTS

| Number | Name | Date |
| --- | --- | --- |
| 839,834 | Gray | Jan. 1, 1907 |
| 1,628,090 | Weiss | May 10, 1927 |
| 2,194,364 | Minor | Mar. 19, 1940 |

FOREIGN PATENTS

| Number | Country | Date |
| --- | --- | --- |
| 634,414 | France | Feb. 17, 1928 |
| 293,086 | Great Britain | June 25, 1928 |